(12) United States Patent
Specchio et al.

(10) Patent No.: US 8,392,884 B2
(45) Date of Patent: Mar. 5, 2013

(54) TEST CASE AUTOMATIC GENERATION METHOD FOR TESTING PROACTIVE GSM APPLICATION ON SIM CARDS

(75) Inventors: Luca Specchio, Naples (IT); Luca Locanto, Portici (IT)

(73) Assignee: Incard S.A., Geneva (CH)

( * ) Notice: Subject to any disclaimer, the term of this patent is extended or adjusted under 35 U.S.C. 154(b) by 1231 days.

(21) Appl. No.: 11/813,107

(22) PCT Filed: Dec. 30, 2005

(86) PCT No.: PCT/EP2005/014126
§ 371 (c)(1),
(2), (4) Date: Apr. 21, 2008

(87) PCT Pub. No.: WO2006/069790
PCT Pub. Date: Jul. 6, 2006

(65) Prior Publication Data
US 2009/0197645 A1     Aug. 6, 2009

(30) Foreign Application Priority Data
Dec. 31, 2004  (EP) .................................. 04425967

(51) Int. Cl.
*G06F 9/44* (2006.01)
(52) U.S. Cl. ......................... 717/124; 717/126
(58) Field of Classification Search .................... 717/124
See application file for complete search history.

(56) References Cited

U.S. PATENT DOCUMENTS

| | | | | |
|---|---|---|---|---|
| 6,430,410 B1 * | 8/2002 | Staber | ........................... | 455/423 |
| 6,505,342 B1 * | 1/2003 | Hartmann et al. | ............. | 717/104 |
| 7,065,070 B1 * | 6/2006 | Chang | ........................... | 370/352 |
| 7,093,238 B2 * | 8/2006 | Givoni et al. | ................. | 717/129 |
| 7,334,219 B2 * | 2/2008 | Cebula et al. | ................. | 717/124 |
| 2004/0064806 A1 * | 4/2004 | Johnston-Watt et al. | ...... | 717/124 |
| 2004/0128652 A1 * | 7/2004 | Mandava et al. | .............. | 717/124 |
| 2005/0288056 A1 * | 12/2005 | Bajikar et al. | ............. | 455/554.2 |
| 2007/0006153 A1 * | 1/2007 | Sultan | ........................... | 717/124 |
| 2007/0168971 A1 * | 7/2007 | Royzen et al. | ................. | 717/124 |

OTHER PUBLICATIONS

3rd Generation Partnership Project; Technical Specification Group Terminals; Test specification for SIM API for Java Card, 3GPP, Jun. 4-6, 2002, available at < http://www.3gpp.com/ftp/tsg_t/TSG_T/TSGT_16/docs/PDFs/Tp-020128.pdf >.*

(Continued)

*Primary Examiner* — Wei Zhen
*Assistant Examiner* — Matthew Brophy
(74) *Attorney, Agent, or Firm* — Allen, Dyer, Doppelt, Milbrath & Gilchrist, P.A.

(57) ABSTRACT

The present invention relates to a method for the definition of case tests and for the automatic generation of the corresponding scripts able to validate and test the GSM applications on IC or SIM Cards, such method being also able to automatically produce the documentation relative to the designed case test, thus realising an instrument able to evolve in time simultaneously with the applications to be tested. The method has been proposed to reduce the test time, to increase the automation (both the designing and the execution), the possibility of reuse and the maintenance relatively to the instruments offered by the prior art which consist of manual tests of the GSM applications or of tests being manually coded in a script language by a programmer.

19 Claims, 6 Drawing Sheets

OTHER PUBLICATIONS

Clark K.L. Et Al.; "*Prolog and Infinie Trees*"; 1982; pp. 231-151; XP000962466.
Alexander Pretschner; "*Classical Search Strategies for Test Case Generation with Constant Logic Programming*"; 2001; pp. 47-60; XP002394753.
Philipps et al.; "*Model-Based Test Case Generation for Smart Cards*"; vol. 80, 2003; XP002333127.
Bernard et al.; "*Generation of Test Sequences from Formal Specifications: GSM 11-11 Standard Case Study*"; vol. 34, No. 10, Aug. 2004; XP001199181.

* cited by examiner

TEST CASE AUTOMATIC GENERATION METHOD FOR TESTING PROACTIVE GSM APPLICATION ON SIM CARDS

FIELD OF THE INVENTION

The present invention generally relates to the field of the GSM applications on IC cards, or more specifically, SIM cards, and, also relating to a test case automatic generation method for testing pro-active GSM applications on SIM cards.

BACKGROUND OF THE INVENTION

The remarkable progress of recent years in the cellular telephone and in the micro information technology has allowed creation of a lot of responses to the increasing demand for apparatuses for mobile data transmission. Such apparatuses allow performing from any place most of the operations that once one were obliged to be performed through a conventional telephone line, for example, sending messages, transferring files, and communicating by fax.

Subscriber Identity Module (SIM) cards are evolving to such an extent as to allow to host directly the characteristics and functions typically available on cellular phones and maintain the possibility of implementing additional functions at a second time. In respect to the prior art cell phone, there exists a special type of SIM card which can be used as a credit card with its own PIN and greater safety in the economical transactions than that ensured by the traditional credit cards.

It is clear that the SIM card is becoming something more than a simple support to the Global System for Mobile Communications (GSM) standard for taking the connotation of an identity card, a purse, a diary, or an organiser. Such increasing complexity and variety of operations available on SIM cards is naturally supported by more sophisticated software. The manufacturers of SIM cards tend to provide the managers with a kit comprising a series of SIM cards and some software applications necessary for developing the first applications.

As the complexity of the software and thus the functionalities of the SIM card grow, the difficulty of testing such functionalities, which are indispensable for ensuring a reliable and safe product, grow. Currently, the majority of tests on the GSM applications is based on the test manual execution by sailing through the application at issue by way of a mobile phone. Such tests are generally indicated as "live tests".

Another common approach is automatically executing instructions or test scripts, coded in a standard programming language, by using a mobile simulator which allows exchanging and tracing commands between a GSM Card and a test system. This approach is disclosed, for instance, in the article by Bernard et al: "Generation of test sequences from formal specifications: GSM 11-11 standard case study" Software Practice & Experience vol. 34, No. 10-August 2004. The advantage of this approach is substantially due to the fact that, after having coded a test with a corresponding script language, the test can be quickly applied on the SIM in the suitably arranged test system.

Figure 1:
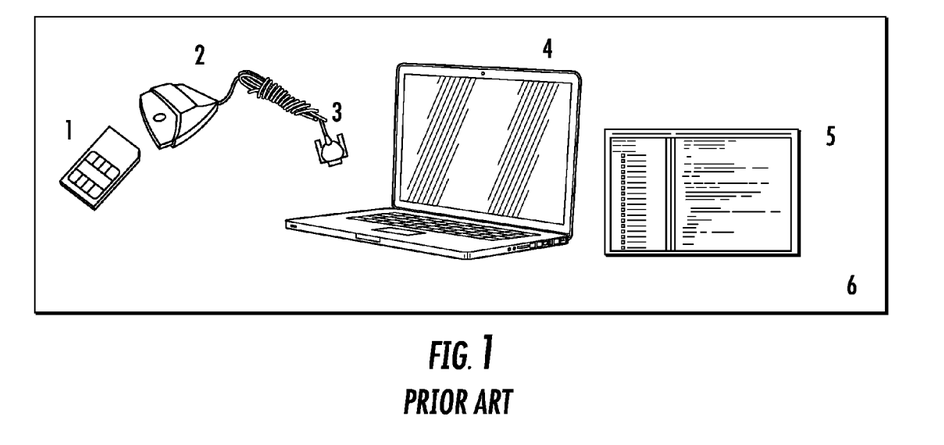
FIG. 1 schematically shows a test system comprising a reading device of Smart Cards, the Smart Card itself the object of the test, a calculator, and the script stored on the calculator, according to the prior art.

In particular, a test case is a group of inputs, execution conditions, and corresponding expected results used for testing an application; the test case input, used with input in the application to be tested, must produce, as outcome, the expected result foreseen by the case test. An example of the application of such test cases applied to the SIM card according to the described approach is schematically shown in FIG. 1 and globally indicated with 6.

In particular, a mobile simulator 2 is schematically shown being connected to the SIM card 1 and used for sending requests and receiving responses from the SIM card 1 object of the test. The mobile simulator 2 is in turn connected through the connection interface 3 to a test system 5 comprising a personal computer 4 whereon a suitably coded and installed test procedure can be activated. The mobile simulator 2 responds to the invocations of the test system 6 trained by the computer 4 whereon a test script has been installed.

When an anomaly is revealed in the software application stored on the SIM card 1, the correction of the revealed fault is attended to and the instructions or test scripts 5 can be repeated in an exhaustive way without making use of personnel, quickly and with low fault probability. This approach is less expensive and more reliable than the live test but it has some drawbacks as highlighted by FIG. 2. In such a representation, it can be seen that the test script 5 must be recoded by a programmer expert in the scripting language and be replaced with a test script 7 suitably modified and installed on the test system 6 supported by the computer 4.

Figure 2:
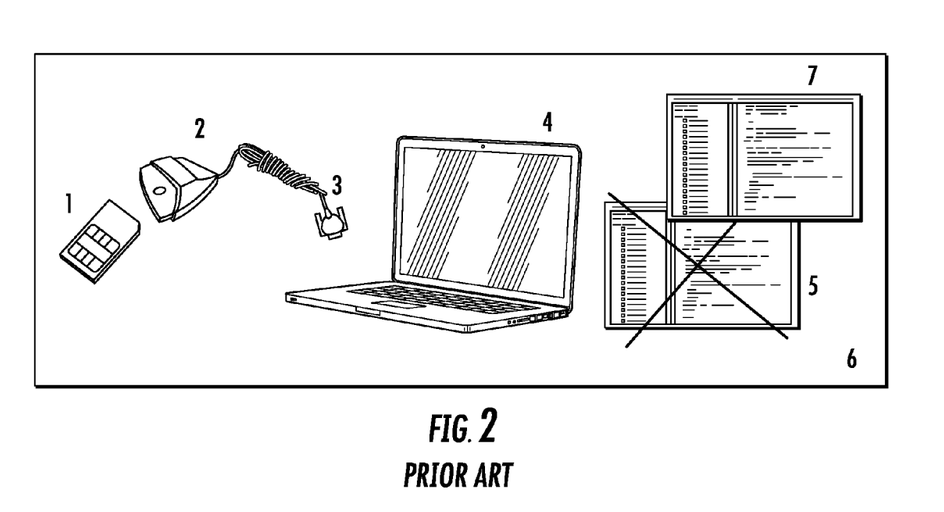
FIG. 2 schematically shows another system according to the prior art, o shown in FIG. 1 through a modification of the test script stored on the calculator.

Any time the software application stored on the SIM card 1 is modified or updated, which is frequent in the approach above described, an intervention is necessary on the test script used for performing the quality control of the software applications installed on the SIM card 1. In such case, a programmer specialized in the scripting language used for generating the test script 5 must take care of replacing the code of the test script 5 with a test script code 7 adapted to the new specifications of the revised application on the SIM card.

Another known approach is disclosed in the article by J. Philipps et al. concerning a: "Model-based test case generation for smart cards"—Electronic Notes in Theoretical Computer Science, vol. 80, 2003 wherein it is disclosed a method for automatically generating test cases from an explicit model of a process under testing. This approach has a drawback due to the fact that the structure or frame of the process under testing must be known in advance before performing an automatic generation of a test case. In other words, the behavior of the system or process under testing must be known in advance to recognize and identify each process step during the testing phase. In this respect, the model-based method of the above approach is based on a state machine that may only evolve from one state to another among a predetermined number of states.

The problem underlying the present method is that of providing a method which automatically generates test case necessary to test the GSM applications on SIM cards, even without knowing in advance the kind of the application, so as to facilitate the evolutions of the test case itself when the GSM application on SIM card undergoes variations and such as to make less expensive in terms of time and resources not only the test step but also the generation step of the group of instructions for the test itself.

SUMMARY OF THE INVENTION

The approach idea underlying the present method is that of providing an automatic generation of the test instructions and of scripts which are able to test and validate the applications on SIM Card. Such a method is also able to automatically produce the documentation corresponding to the generated test instructions, thus obtaining an instrument able to change over time simultaneously with the applications to be tested. On the basis of such an approach, idea the technical problem is solved by a method for testing a mobile communications application on an Integrated Circuit (IC) card includes generating a tree structure having a root node, a plurality of terminal nodes, and paths extending between the root node and each of the terminal nodes, each node being associated with a pro-active command. The method also includes generating test instructions associated with each pro-active command within each path, generating a script associated with each path, generating, in each script, a comparison function between expected data provided by the associated path for each pro-active command and real data from the mobile communications application, and generating test documentation corresponding to the script and for each pro-active command.

A method relates to the test case automatic generation for testing the GSM applications on SIM cards starting from a tree structure representation of the aforesaid application.

A method for the automatic generation relative both to the designing and the implementation of test scripts, is provided.

In some embodiments, the test documentation may be structured in at least one of a general application heading, a heading for each test case, and a body for each test instruction. Also, the test documentation may comprise an index associated with an application structure.

The characteristics and advantages of the method and of the test system will be apparent from the following description of an embodiment thereof given by way of indicative and non limiting example with reference to the annexed drawings.

DETAILED DESCRIPTION OF THE PREFERRED EMBODIMENTS

Figure 3:
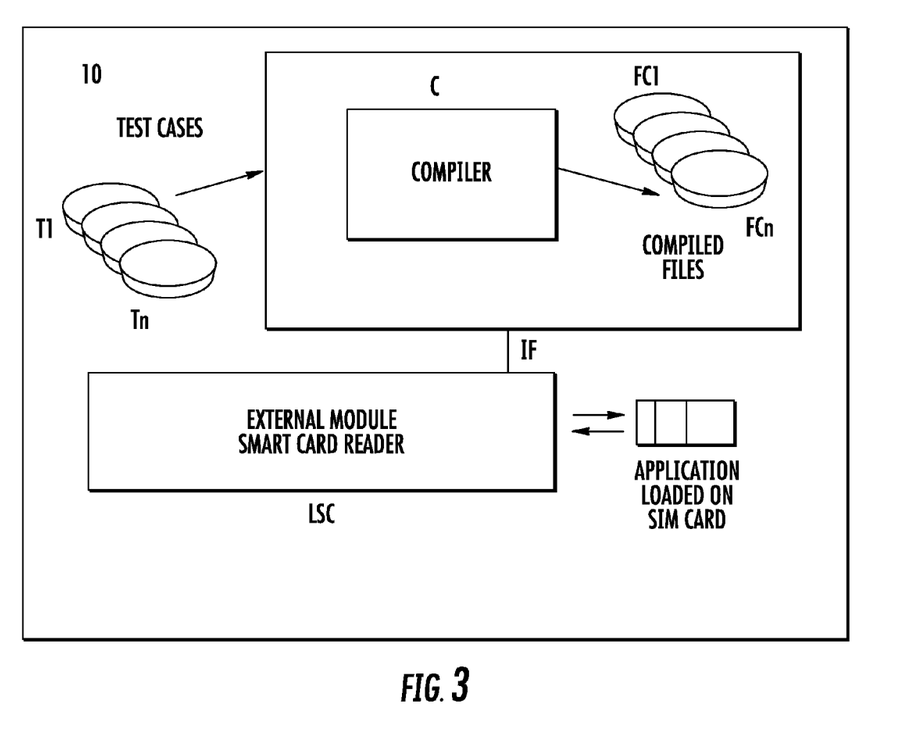
FIG. 3 schematically shows a test system comprising a reading device of SIM Cards, the Sim Card itself the object of the test and a test case self-generated and compiled by the calculator through the method realized according to the invention.

With reference to such figures, and in particular to the example of FIG. 3, 10 globally and schematically indicates a test system realized according to the invention. In particular, the test system 10 is shown by way of non limiting example with reference to the connection between a reader of the SIM Card and a processor or calculator which stores the group of instructions or scripts for the execution of the test.

In general, it is possible to realize the test system 10 by connecting a software reader placed on a physical unit (for example, a SIM Card) to a calculator, being such calculator predisposed for the execution of scripts which interact with the software stored on the physical unit and object of the test.

The method and the system according are for the generation of test cases and for the simultaneous automatic generation of scripts for testing GSM applications of IC Cards; the method provides the steps of: representation of an application during the test step inside a tree structure wherein a single node is a pro-active GSM command; identification of all the paths inside the tree structure from a root node to plural terminal nodes; automatic definition of a test instruction associated with each GSM pro-active command inside a given path; automatic generation of a corresponding script; generation of a comparison function between expected and real data inside the script, for each pro-active command; and automatic generation of test documentation corresponding to the script.

In particular, the test system 10, as shown by way of example in FIG. 3, comprises a group of test cases T1, . . . , Tn compiled by the compiler C, being part of a generic calculator, in a plurality of compiled files FC1, . . . , FCn. Each one of these files is sent to the Sim Card LSC reader through the connection interface IF between the calculator and the SIM Card reader itself LSC. In respect to the prior art, each test case T1, . . . , Tn is manually coded by a programmer who, on the basis of the operation specifications of the software to be tested on the Sim Card, and of the evolutionary or adaptive modifications of the same, codes the test instruction T1, . . . , Tn by way of any programming language which can be understood by the calculator.

Advantageously, according to the invention, the test system 10 comprises a test case T1, . . . , Tn automatic coding method, i.e. a code self-generation method for each test case T, . . . , Tn which can be interpreted by the calculator. In particular, the system relates to the test instruction T1, . . . , Tn automatic generation supporting both the designing and the implementation of the test starting from the representation of a tree structure of the GSM application on a IC Card.

In more detail, the provided method comprises the following steps: representation of the application during the test step by providing a tree structure wherein a single node or a node branch are GSM pro-active commands; identification of all the paths inside the tree structure from the root node to the terminal nodes; for each path test case automatic generation so as to exercise all the GSM pro-active commands inside the path; for each test case, automatic generation of a corresponding script to be associated to each path; for each GSM pro-active command generation of a comparison function inside the scripts between expected data provided by the test case and real data detected by running the GSM application of the IC Card the expected data are constructed by using the specifications of the application; and automatic generation of the test documentation.

Figure 4:
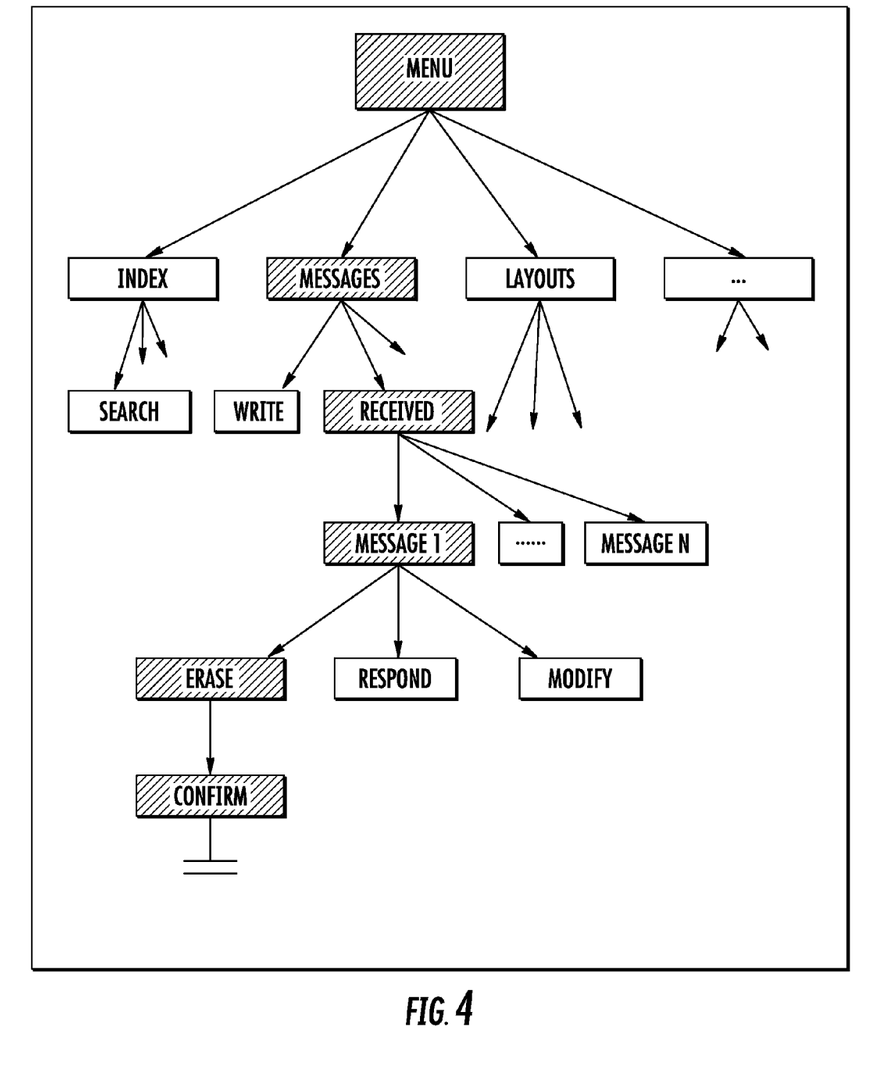
FIG. 4 schematically shows the structure of a generic GSM application on a SIM card by way of a tree representation through the method according to the invention.

In particular, FIG. 4 shows the structure of an application on IC Card for which it is necessary to generate a test instruction: each path of such tree structure represents one of the hypothetical commands required to IC Card. The shown example is given by way of example as regards the possible hierarchic representation of a GSM application on IC Card and it is non limiting with reference to the typology of the commands taken as example. With reference to FIG. 4, each node of the tree structure, starting from the root up to the leaves, is identified with the term "pro-active command" whereas each path from the root to a leaf is identified with the term "pro-active session". Each reference made hereafter to the term "pro-active command" is as a node of the tree structure whereon the application stored on the Card is developed.

Similarly, each reference made hereafter to the term "pro-active session" must be intended as a path from the root to a generic leaf of the tree structure whereon the application stored on the Card is developed, i.e. a finished path for which an expected result is to be awaited. Advantageously, each pro-active command can be graphically represented by a specific node XML for which a specific syntax and semantic has been previously defined.

In particular, the XML (acronym of Extendible Markup Language) is a predetermined metalanguage, i.e. a language which allows to create other languages, which is well suited to the structural representation at issue.

The XML allows as its native property to define the structure and the characteristics of the marking languages, i.e. of those languages which allow to realize documents through a series of tags which insulate and characterise the document elements, as in the example hereafter reported:

```
<book>
    <author>
        <name>Dante</name>
        <surname>Alighieri</surname>
    </author>
    <title Divina Commedia</title>
    <publishinghouse>Lettere e
Dintorni</ publishinghouse >>
    <edition>
        <place>Milano</place>
        <year>2003</year>
    </edition>
</book>
```

The base concept of the XML is that of insulating the parts composing a document, thus succeeding in singularly acceding thereto for then processing them by virtue of the structure the document itself is provided with. The term "document" is here intended in the most general and abstract sense possible, one can thus refer to the above reported example more abstractly as to a "book" and not as to a document in the mere meaning of the term. The XML, besides defining the document structure, comprises a component, said DTD (acronym of Document Type Definition), which establishes the rules the document has to respect, i.e. it defines a grammar used for generating the document.

Figure 5:
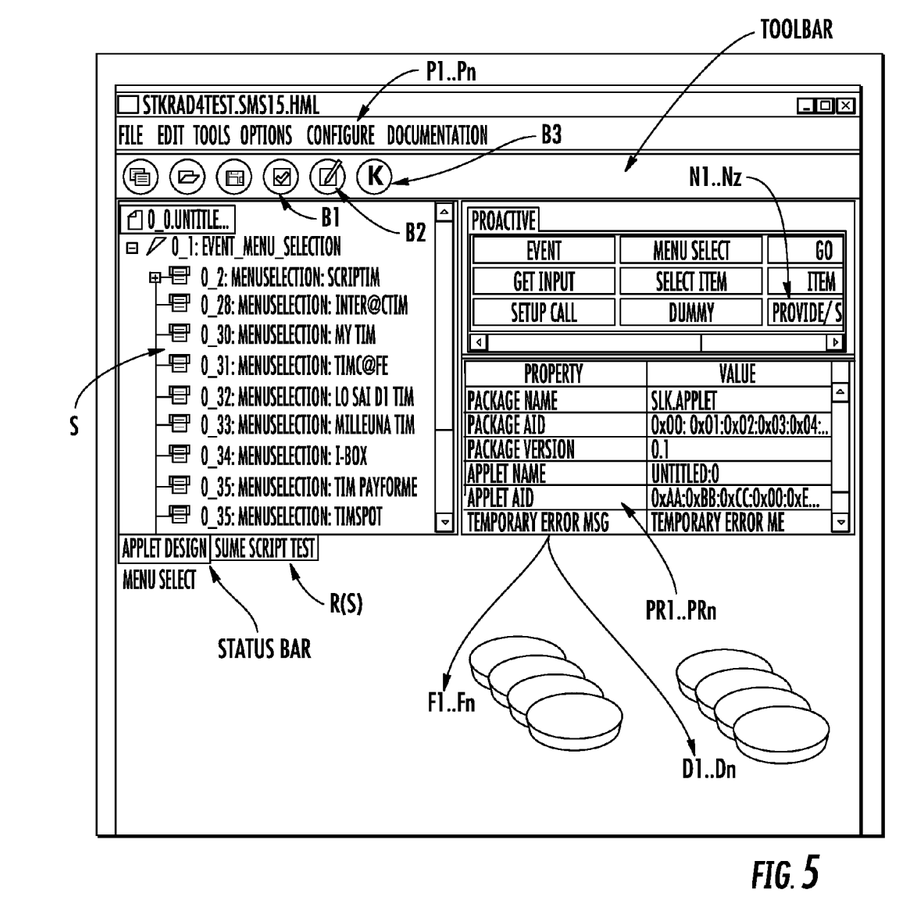
FIG. 5 shows some details of the graphic interface which supports the method according to the invention.

Advantageously, each pro-active command is represented by a node XML thanks to which it is possible to define some corresponding rules on the basis of the type of pro-active command itself. Similarly each pro-active session from the root-to-a-leaf is represented by a path through nodes XML, i.e. by a concatenation of pro-active commands. With reference to FIG. 5, the application schematisation and the code is schematically depicted for writing automation for the test according to the following successive steps and with the help of the hereafter described XML graphic interface.

S, in FIG. 5, indicates a tree structure which schematically depicts the application at issue. In particular N1 ... Nz, in the right side section of the graphic interface, schematically depicts z different types of pro-active commands defined for the application representation by way of the structure S.

Each of the aforesaid z pro-active commands is a node whereof the PR1, ..., PRn properties and the corresponding values can be set. A parameter P1, ..., Pn can be also associated to each pro-active command N1 ... Nz, by way of the configuration menu. The graphic representation of the application is advantageously facilitated by way of a technique of the Drag&Drop type of the pro-active commands by way of the allotment of suitable values to the properties of the pro-active commands themselves.

Figure 6:
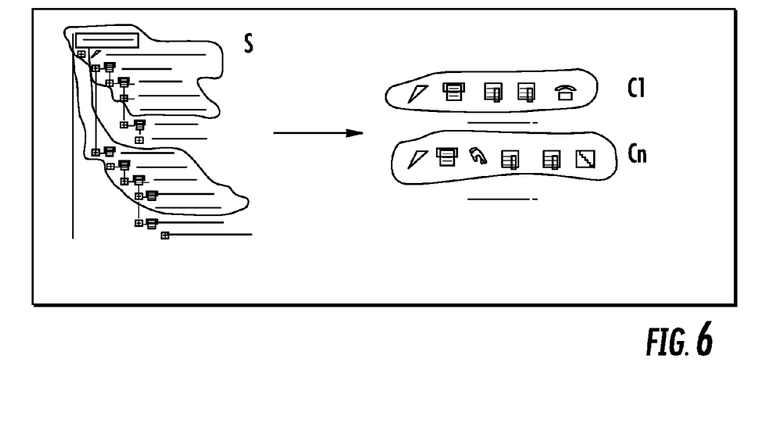
FIG. 6 schematically shows the division of the tree structure of a generic GSM application on SIM card in node-root-node leaf paths through the method according to the invention.

Not only the writing process of the test case and of the corresponding code occurs thanks to the aforesaid representation: FIG. 6 shows how the tree structure S is automatically divided in all the possible paths C1, ..., Cn, with a starting node represented by the tree root and a destination node represented by a leaf. Advantageously, each of these paths is automatically translated, according to the provided system, into a "main" method which contains a call to an initialization function of the IC Card and a call to a test function containing a method for each pro-active command being part of the path.

Figure 7:
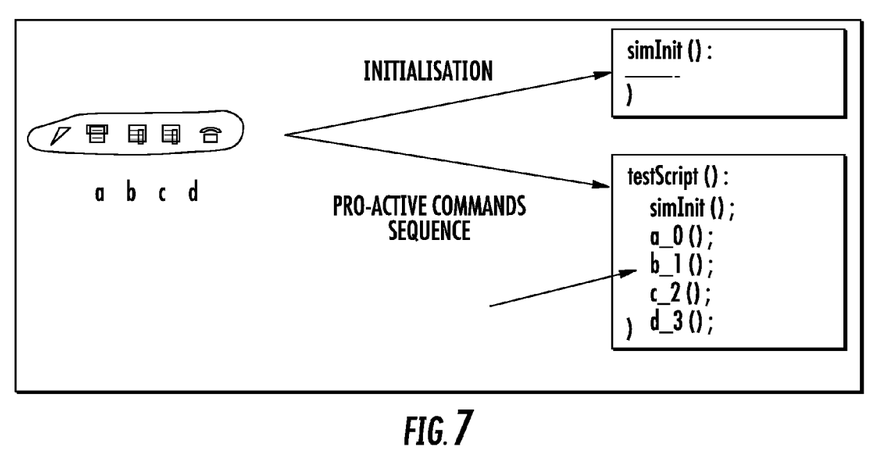
FIG. 7 schematically shows the initialization function of the SIM Card for the test step and the mapping of the nodes constituting one of the possible paths of the application with corresponding methods through the method according to the invention.

With reference to FIG. 7 the path "a b c d" is thus automatically translated into the "main" method containing a call to the initialization function "Init" and to a call to the "testScript" test function, containing in turn a method for each pro-active command being part of the path (methods a_0( ), b_1( ), c_2( ), d_3( )). For each GSM pro-active command a, b, c, d, a function is generated for comparing inside the scripts expected data provided by the test case and real data obtained from the application running on the Card, by using the specifications of the application.

Figure 8:
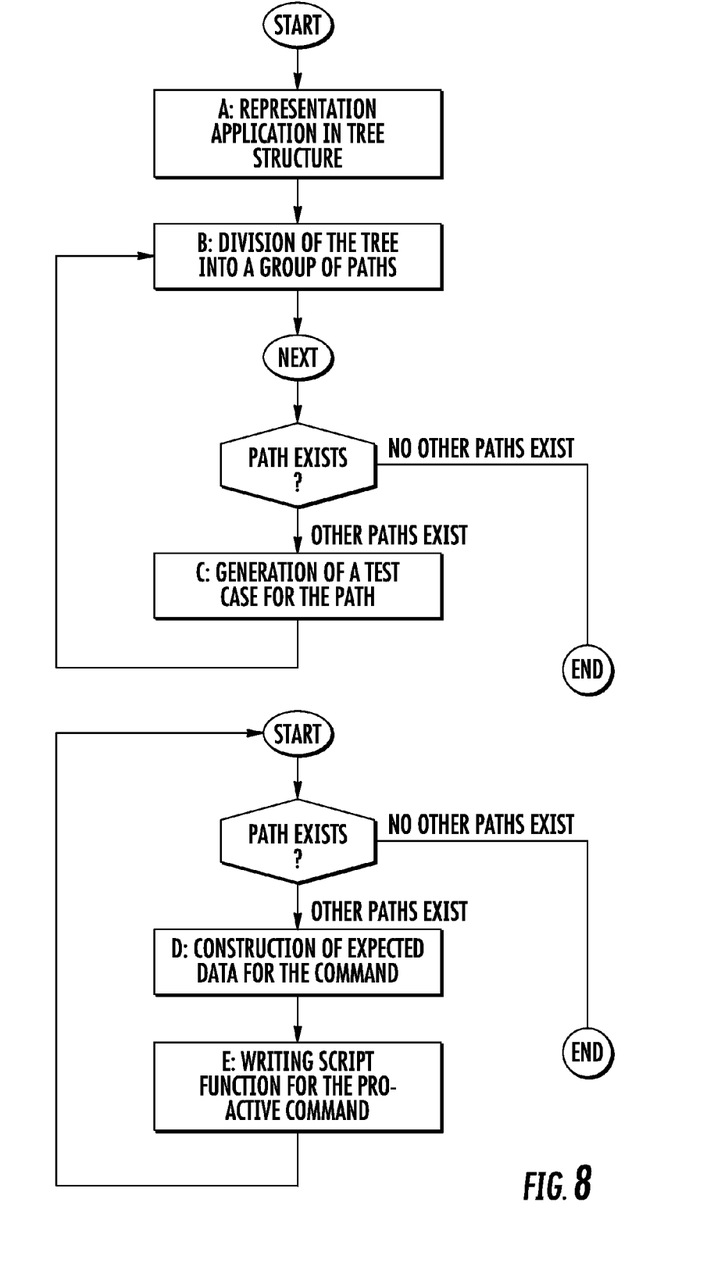
FIG. 8 shows a block diagram which depicts schematically the iterative process of the tree structure division in root-leaf paths for the test case automatic generation through the method according to the invention.

The described automatic coding process for the path "a b c d" is reiterated on all the path constituting the GSM application, for example, according to the block scheme reported in FIG. 8. In particular, with reference to the block structure of FIG. 8, the step C relative to the "Test case generation for the path", can be in turn detailed by the block scheme depicted in FIG. 6.

The invention provides an approach to the technical problem and achieves several advantages. The first of which is given by the fact that it is possible to shorten the analysis and reprocessing times of the instruction group associated to a given application on SIM Card. Moreover, it is possible to associate a series of instructions or script, which represent or summarize the applications themselves, to the test step of an algorithm application.

The invention claimed is:

1. A method for generation of test cases and scripts for testing mobile communications applications on integrated circuit (IC) cards, the method comprising:
    representing at least one mobile communications application comprising a plurality of proactive commands to be executed on the IC cards during the testing by providing a tree structure, wherein each proactive command is represented by a node in the tree structure;
    identifying paths in the tree structure from a root node to a plurality of terminal nodes;
    generating test instructions associated with each pro-active command within each path;
    generating a script associated with each path;
    generating, in each script, a comparison function between expected data provided by the associated path for each pro-active command and real data from the at least one mobile communications application; and
    generating test documentation corresponding to the script and for each pro-active command.

2. The method according to claim 1 wherein the mobile communications applications comprise Global System for Mobile communications (GSM) applications; and wherein each pro-active command comprises a GSM pro-active command.

3. The method according to claim 1 further comprising:
representing each path from the root node to a leaf of a pro-active session through a concatenation of the pro-active commands; and
graphically representing each pro-active command in an eXtendible Markup Language (XML) code with a desired syntax and semantic.

4. The method according to claim 3 wherein a graphical interface for the XML code modifies properties of the root and terminal nodes and associated pro-active commands; and wherein a Document Type Definition component of the XML code establishes rules that the test documentation implements.

5. The method according to claim 4 wherein the rules comprise a grammar rule for generating the test documentation.

6. The method according to claim 1 wherein the tree structure is divided into possible paths from the root node to leaves through an iterative coding process.

7. The method according to claim 6 further comprising coding each node of each path into a script function; and wherein the script functions are introduced by an initialization procedure of the IC card for test execution.

8. The method according to claim 1 wherein the test documentation is structured in at least one of a general application heading, a heading for each test case, and a body for each test instruction.

9. The method according to claim 1 wherein the test documentation comprises an index associated with an application structure.

10. A method for testing a mobile communications application comprising a plurality of proactive commands to be executed on the IC cards on an Integrated Circuit (IC) card comprising:
generating a tree structure having a root node, a plurality of terminal nodes, and paths extending between the root node and each of the terminal nodes, wherein each pro-active command is represented by a node in the tree structure;
generating test instructions associated with each pro-active command within each path;
generating a script associated with each path;
generating, in each script, a comparison function between expected data provided by the associated path for each pro-active command and real data from the mobile communications application; and
generating test documentation corresponding to the script and for each pro-active command.

11. The method according to claim 10 wherein the mobile communications application comprises a Global System for Mobile communications (GSM) application; and wherein each pro-active command comprises a GSM pro-active command.

12. The method according to claim 10 further comprising:
representing each path from the root node to a leaf of a pro-active session through a concatenation of the pro-active commands; and
graphically representing each pro-active command in an eXtendible Markup Language (XML) code with a desired syntax and semantic.

13. The method according to claim 10 wherein the tree structure is divided into possible paths from the root node to leaves through an iterative coding process.

14. The method according to claim 13 further comprising coding each node of each path into a script function; and wherein the script functions are introduced by an initialization procedure of the IC card for test execution.

15. An integrated circuit (IC) card comprising:
a memory configured to store a mobile communications application comprising a plurality of proactive commands to be executed; and
a processor configured to
generate a tree structure having a root node, a plurality of terminal nodes, and paths extending between the root node and each of the terminal nodes, wherein each proactive command is represented by a node in the tree structure,
generate test instructions associated with each pro-active command within each path,
generate a script associated with each path,
generate, in each script, a comparison function between expected data provided by the associated path for each pro-active command and real data from the mobile communications application, and
generate test documentation corresponding to the script and for each pro-active command.

16. The IC card according to claim 15 wherein the mobile communications application comprises a Global System for Mobile communications (GSM) application; and wherein each pro-active command comprises a GSM pro-active command.

17. The IC card according to claim 15 wherein said processor is configured to:
represent each path from the root node to a leaf of a pro-active session through a concatenation of the pro-active commands; and
graphically represent each pro-active command in an eXtendible Markup Language (XML) code with a desired syntax and semantic.

18. The IC card according to claim 15 wherein the tree structure is divided into possible paths from the root node to leaves through an iterative coding process.

19. The IC card according to claim 18 wherein said processor is configured to code each node of each path into a script function; and wherein the script functions are introduced by an initialization procedure of the IC card for test execution.

* * * * *